(12) United States Patent
Nowka

(10) Patent No.: US 6,529,924 B1
(45) Date of Patent: Mar. 4, 2003

(54) METHOD AND APPARATUS FOR GENERATING SHIFT AMOUNT SIGNALS FOR AN ALIGNMENT SHIFTER

(75) Inventor: Kevin John Nowka, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/535,525

(22) Filed: Mar. 27, 2000

(51) Int. Cl.[7] .............................. G06F 7/00; G06F 7/42
(52) U.S. Cl. ........................................ 708/209; 708/505
(58) Field of Search ................................ 708/209, 505, 708/491

(56) References Cited

U.S. PATENT DOCUMENTS

| | | | | | |
|---|---|---|---|---|---|
| 4,121,298 A | * | 10/1978 | Akushsky et al. | ........... | 708/491 |
| 4,281,391 A | * | 7/1981 | Huang | .......................... | 708/491 |
| 4,807,172 A | * | 2/1989 | Nukiyama | .................... | 708/209 |
| 4,908,788 A | * | 3/1990 | Fujiyama | ..................... | 708/209 |
| 4,999,800 A | * | 3/1991 | Birger | .......................... | 708/209 |
| 4,999,803 A | * | 3/1991 | Turrini et al. | ................ | 708/505 |
| 5,442,576 A | * | 8/1995 | Gergen et al. | .............. | 708/209 |
| 5,790,444 A | * | 8/1998 | Olson et al. | ................. | 708/209 |

\* cited by examiner

*Primary Examiner*—Tan V. Mai
(74) *Attorney, Agent, or Firm*—Casimer K. Salys; Bracewell & Patterson, L.L.P.

(57) ABSTRACT

A method for generating shift amount signals for an alignment shifter is disclosed. In a process of adding a first floating-point number and a second floating-point number, wherein the floating-point numbers includes a sign, a mantissa, and an exponent, an alignment shifter is used to provide proper alignment for the floating-point numbers. Residue arithmetics are performed on an exponent of the first floating-point number and an exponent of the second floating-point number to generate a residue shift amount. The residue shift amount is then decoded to obtain shift amount signals that are readable by the alignment shifter.

7 Claims, 3 Drawing Sheets

METHOD AND APPARATUS FOR GENERATING SHIFT AMOUNT SIGNALS FOR AN ALIGNMENT SHIFTER

BACKGROUND OF THE INVENTION

1. Technical Field

The present invention relates to a method and apparatus for data processing in general, and in particular to a method and apparatus for processing floating-point numbers. Still more particularly, the present invention relates to a method and apparatus for generating shift amount signals for an alignment shifter.

2. Description of the Prior Art

According to the IEEE standard, a floating-point number consists of a mantissa (M), an exponent (E), and a sign (S). For example, a floating-point number 1234.56 can be specified by $1.0011010010 \times 2^{10}$, where M=1.0011010010, E=10, and S=0. When performing floating-point arithmetic, the exponents of two floating-point numbers are required to be aligned before any addition or subtraction of the mantissas of the two floating-point numbers can be performed. For example, the addition of floating-point numbers 1234.56 (M=1.0011010010 and E=10) and 123.456 (M=1.111011 and E=6) requires an alignment of the mantissas by the amount of the difference of their exponents, that is, 10−6=4.

Generally speaking, the mantissa of a floating-point number having a smaller exponent is required to be shifted to the right by an amount equal to the difference in exponents. This allows the usage of an unidirectional alignment shifter that is easier and less complicated than a bidirectional alignment shifter. Otherwise, in some cases in which one of the mantissas is not readily available by reason of the arithmetic operations, the available mantissa is always shifted to align with the unavailable mantissa using the exponents to determine the proper shift amount. This requires an alignment shifter that is capable of shifting in both directions depending on which of the two exponents is greater. The present disclosure provides an improved method for generating shift amount signals to drive an alignment shifter.

SUMMARY OF THE INVENTION

In a process of adding a first floating-point number and a second floating-point number, wherein the floating-point numbers includes a sign, a mantissa, and an exponent, an alignment shifter is used to provide proper alignment for the floating-point numbers. In accordance with a preferred embodiment of the present invention, residue arithmetic is performed on an exponent of the first floating-point number and an exponent of the second floating-point number to generate a residue shift amount. The residue shift amount is then decoded to obtain shift amount signals that are used by the alignment shifter.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
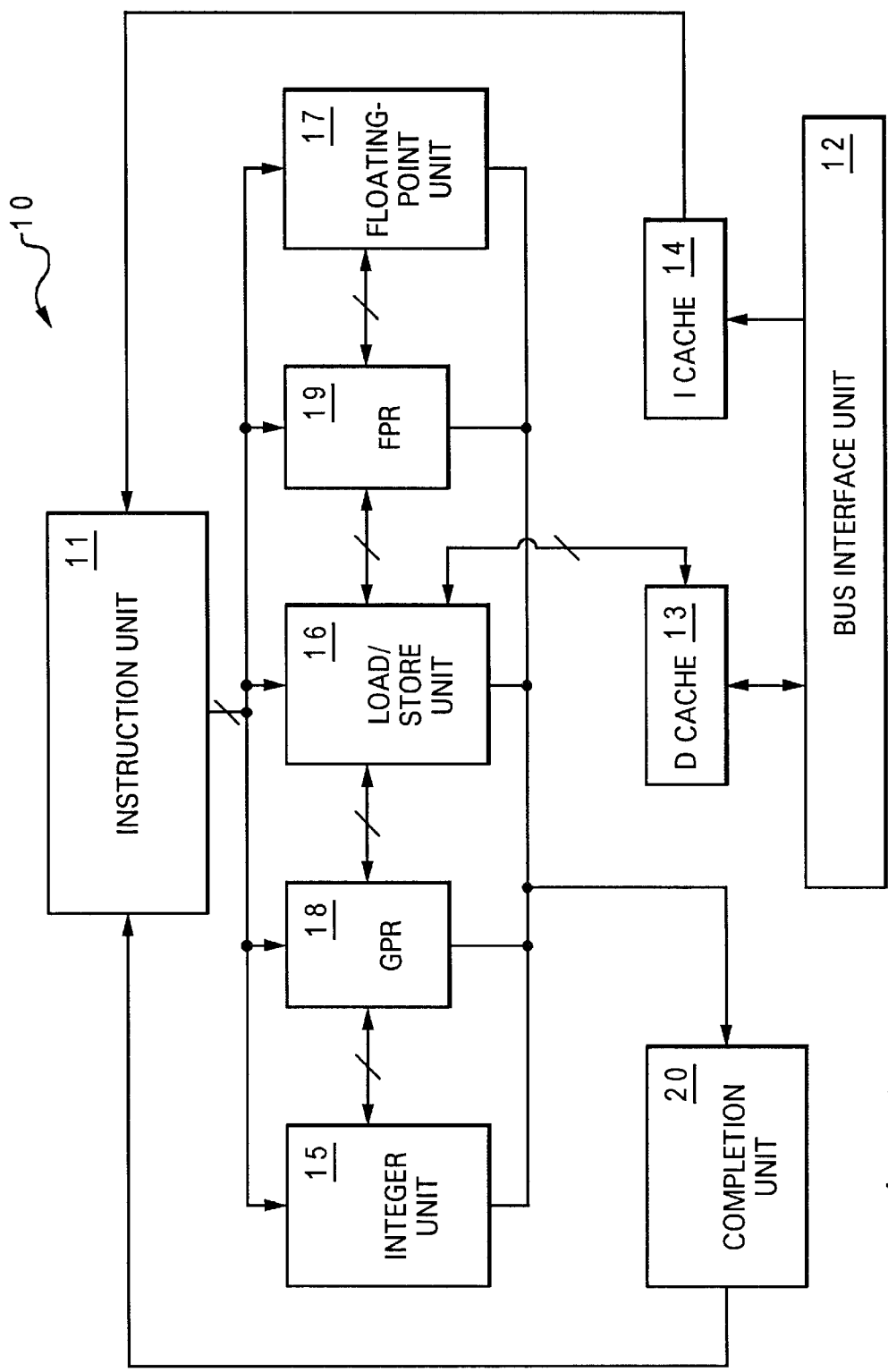
FIG. 1 is a block diagram of a processor in which a preferred embodiment of the present invention may be incorporated.

Referring now to the drawings and in particular to FIG. 1, there is depicted a block diagram of a processor in which a preferred embodiment of the present invention may be incorporated. Within a processor 10, a bus interface unit 12 is coupled to a data cache 13 and an instruction cache 14. Both data cache 13 and instruction cache 14 are high speed set-associative caches which enable processor 10 to achieve a relatively fast access time to a subset of data or instructions previously transferred from a main memory (not shown). Instruction cache 14 is further coupled to an instruction unit 11 which fetches instructions from instruction cache 14 during each execution cycle.

Processor 10 also includes three execution units, namely, an integer unit 15, a load/store unit 16, and a floating-point unit 17. Each of execution units 15–17 can execute one or more classes of instructions, and all execution units 15–17 can operate concurrently during each processor cycle. After execution has terminated, execution units 15–17 store data results to a respective rename buffer, depending upon the instruction type. Then, any one of execution units 15–17 signals a completion unit 20 that the instruction unit has been finished. Finally, instructions are completed in program order by transferring result data from the respective rename buffer to a general purpose register 18 or a floating-point register 19.

Figure 2:
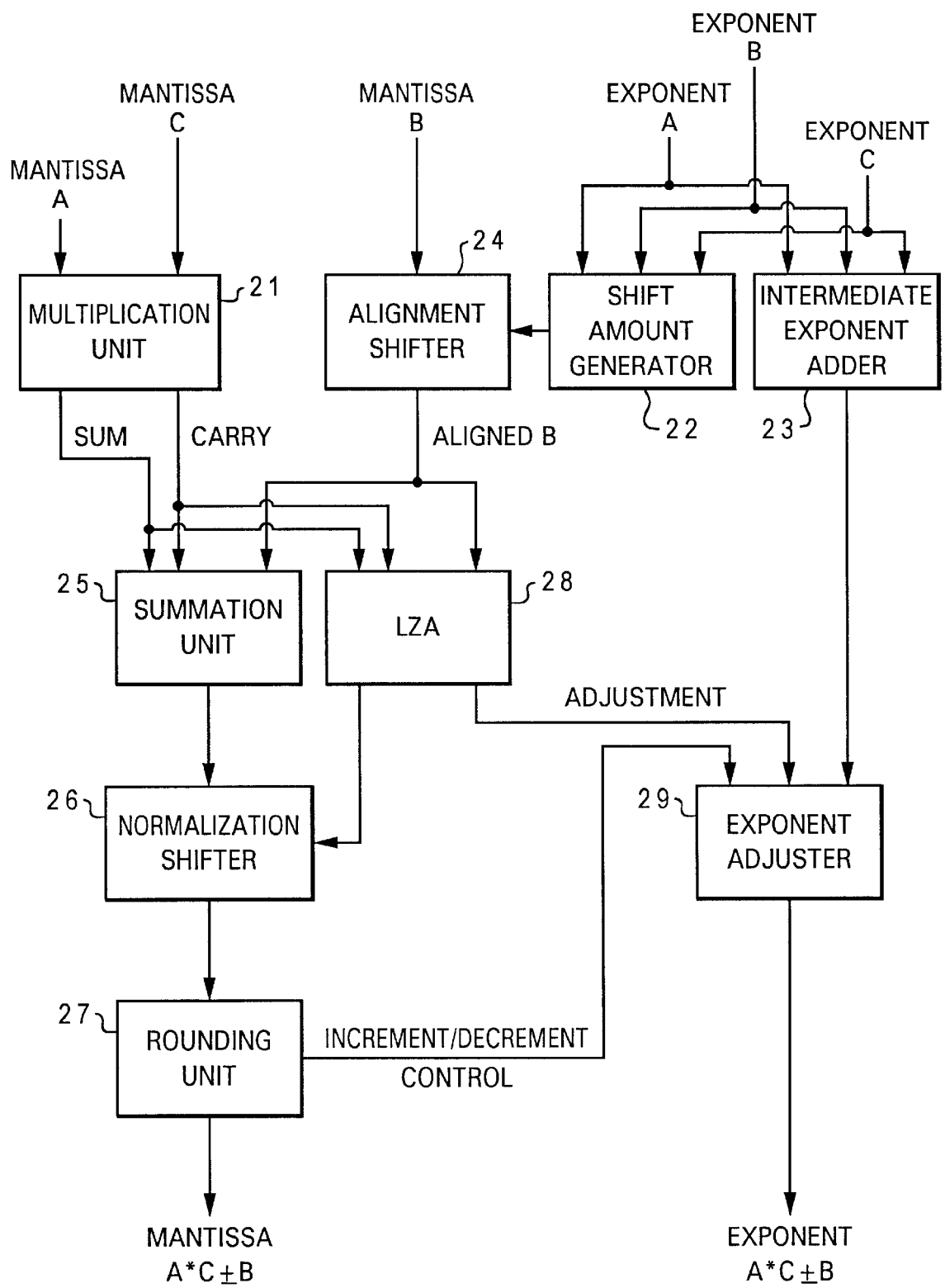
FIG. 2 is a block diagram of a multiply and accumulate unit within the floating-point unit from FIG. 1, as in accordance with a preferred embodiment of the present invention.

With reference now to FIG. 2, there is illustrated a block diagram of a multiply and accumulate unit within floating-point unit 17 from FIG. 1, in accordance with a preferred embodiment of the present invention. As shown, a multiplication unit 21 receives a mantissa of a floating-point number A ($M_A$) and a mantissa of a floating-point number C ($M_C$) to produce a sum of product $M_{A*C}$ and a carry of product $M_{A*C}$. An alignment shifter 24 receives a mantissa of a floating-point number B ($M_B$) and performs an alignment function to align $M_B$ with the sum of product $M_{A*C}$. From there, the sum of product $M_{A*C}$ and the carry of product $M_{A*C}$ are added to an aligned $M_B$ within a summation unit 25. The result from summation unit 25 is then sent to a normalization shifter 26 for normalization based on the result from a leading-zero anticipator (LZA) 28. The result from normalization shifter 26 is subsequently sent to a rounding unit 27 to generate a mantissa of A*C±B.

In the meantime, an intermediate exponent adder 23 combines an exponent of the floating-point number A ($E_A$), an exponent of the floating-point number B ($E_B$), and an exponent of the floating-point number C ($E_C$) to generate an intermediate exponent of A*C±B. By combining the adjustment result from LZA 28 and increment/decrement control signals from rounding unit 27 with the intermediate exponent of A*C±B from intermediate exponent adder 23, an exponent adjuster 29 generates an exponent of A*C±B.

In order to determine how far to shift $M_B$ and in which direction, alignment shifter 24 receives shift amount signals from a shift amount generator 22. According to the shift amounts specified by the shift amount signals, alignment shifter 24 then positions, through digit shifting, the most significant digit of a first mantissa to a position within a second mantissa. For a floating-point addition in the example shown in FIG. 2, the shift amount is formed by subtracting an E-digit exponent $E_B$ from an E-digit exponent $E_{A*C}$. The shifting is accomplished by decoding the shift amount signals, via a decoder, into a fully-decoded numerical representation of the shift amount that can be applied as selection inputs to a multiplexor within alignment shifter 24 for each digit. For example, if alignment shifter 24 is implemented with an eight-way multiplexor, a three-bit shift amount signal can be decoded into selection inputs for any one or more of the eight ways of the eight-way multiplexor.

Most prior art alignment shifters are only capable of shifting positions in the order of power of two. The present invention provides a method and apparatus to generate shift amount signals of non-power of two along with an alignment shifter that can accept such shift amount signals.

As a preferred embodiment of the present invention, shift amount generator 22 performs residue arithmetic on the exponents of two floating-point numbers for generating shift amount signals. In a general case, the shift amount for a radix-n alignment shifter is the radix-n residue of the difference of the exponents of two floating-point numbers. Specifically, for an E-digit binary difference $D=d_0\ d_1\ d_3\ d_4\ d_5\ \ldots\ d_{E-1}$ of the E-digit exponents of two floating-point numbers, the shift amount SA for a radix-n alignment shifter can be calculated by:

$$SA=[d_0*2^{E-1}\ \text{MOD}\ n+d_1*2^{E-2}\ \text{MOD}\ n+\ldots d_{E-2}*2\ \text{MOD}\ n+d_{E-1}]\ \text{MOD}\ n \quad (1)$$

Instead of generating the shift amount SA as shown in equation (1), the present invention forms the shift amount SA by repeatedly applying residue arithmetic directly on the E-digit exponents of two floating-point numbers. The residue arithmetic operations are preferably performed in a reduction array formed by several sets of residue arithmetic carry-save adders (RACSAs).

The present invention can be illustrated by the following example with two floating-point numbers A and B, both having a six-digit exponent (i.e., E=6), and a radix-6 alignment shifter (i.e., n=6). The exponent of the floating-point number A is represented by EA, and the exponent of the floating-point number B is represented by EB. The binary difference D of EA minus EB can be calculated as follows:

$$\begin{array}{ccccccc} & EA_0 & EA_1 & EA_2 & EA_3 & EA_4 & EA_5 \\ + & \overline{EB_0} & \overline{EB_1} & \overline{EB_2} & \overline{EB_3} & \overline{EB_4} & \overline{EB_5} \\ + & & & & & & 1 \\ \hline D= & D_0 & D_1 & D_2 & D_3 & D_4 & D_5 \end{array} \quad (2)$$

Figure 3:
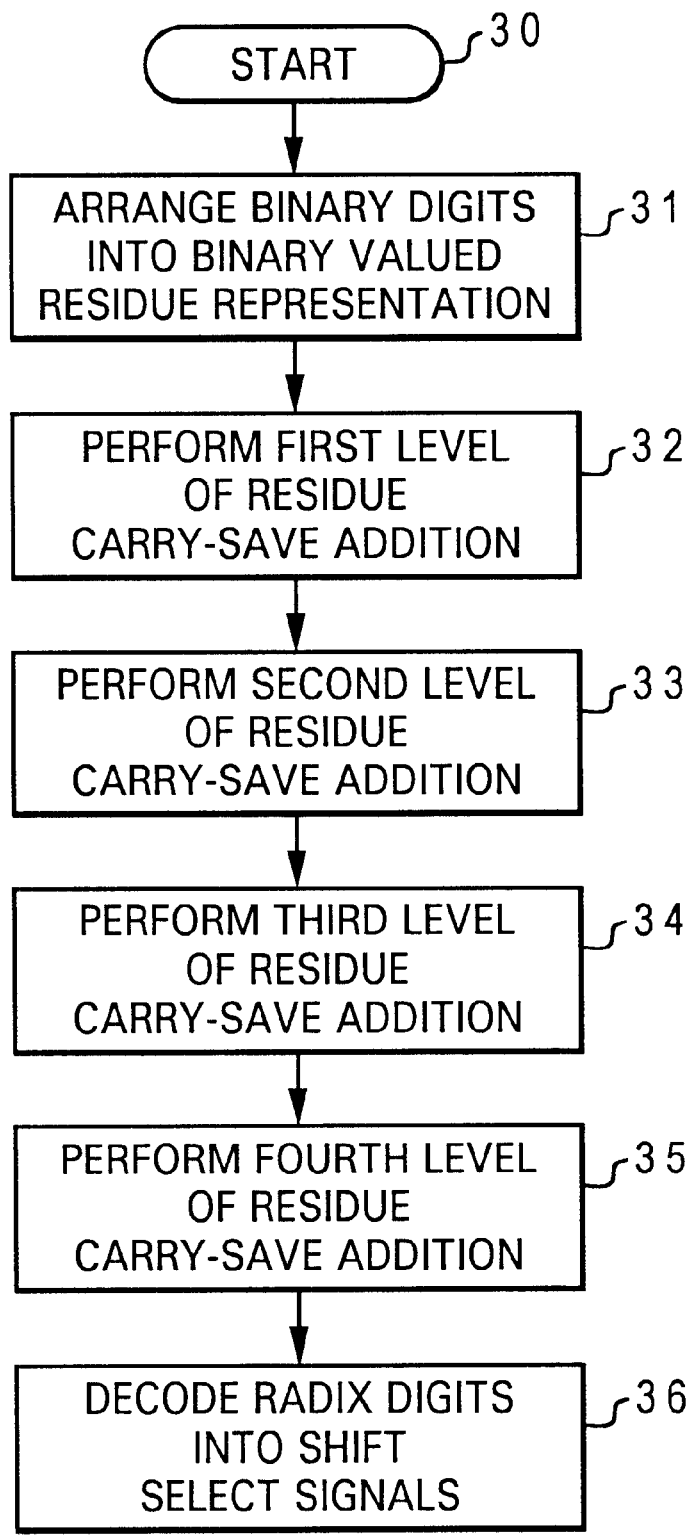
FIG. 3 is a high-level logic flow diagram of a method for generating shift amount signals for an alignment shifter, in accordance with a preferred embodiment of the present invention.

Referring now to FIG. 3, there is illustrated a high-level logic flow diagram of a method for generating shift amount signals for a radix-6 alignment shifter, in accordance with a preferred embodiment of the present invention. As shown in block 31, all binary digits of EA and $\overline{EB}$ are first organized into a binary-valued residue representation. Accordingly, each binary digit of EA and $\overline{EB}$ from equation (2) is assigned a binary weight. For example, the binary weight for $EA_5$ and $\overline{EB_5}$ (and the constant 1) is 1, the binary weight for $EA_4$ and $\overline{EB_4}$ is 2, the binary weight for $EA_3$ and $EB_3$ is 4, the binary weight for $EA_2$ and $\overline{EB_2}$ is 8, the binary weight for $EA_1$, and $\overline{EB_1}$ is 16, and the binary weight for $EA_0$ and $\overline{EB_0}$ is 32. Each of the assigned binary weights is then converted to its corresponding residue-6 weight representation. The residue-6 weight representations for binary weights 1, 2, 4, 8, 16, and 32 are 1, 2, 4, 2, 4, and 2, respectively. Since there are essentially three different residue-6 weight representations, the binary-valued residues can be conveniently grouped within a reduction array having three separate columns, namely, a residue-6 weight 1 column, a residue-6 weight 2 column, and a residue-6 weight 4 column, as depicted in Table I.

Then, several levels of residue-6 carry-save additions need to be performed in order to generate the binary-valued residue-6 representation of difference D (i.e., the shift amount SA). The process begins with a first-level residue-6 carry-save additions, as shown in block 32. RACSAs are preferably used to perform the first-level residue-6 carry-save additions. For a residue-6 representation as depicted in this example, RACSAs for the residue-6 weights of 1,2, and 4 are needed, with each residue-6 weight receiving three inputs from each binary digit of EA and $\overline{EB}$ from equation (2). These RACSAs are preferably implemented as follows:

--- residue - 6 weight 1 RACSAs none of three inputs = 1 => no output
one of three inputs = 1 => output to only weight 1 in Table I
two of three inputs = 1 => output to only weight 2 in Table I
three of three inputs = 1 => output to weight 1 and weight 2 in Table I residue - 6 weight 2 RACSAs none of three inputs = 1 => no output
one of three inputs = 1 => output to only weight 2 in Table I
two of three inputs = 1 => output to only weight 4 in Table I
three of three inputs = 1 => no output residue - 6 weight 4 RACSAs none of three inputs = 1 => no output
one of three inputs = 1 => output to only weight 4 in Table I
two of three inputs = 1 => output to only weight 2 in Table I
three of three inputs = 1 => not output

---

With a first set of residue-6 RACSAs as depicted above, the binary digits of EA and $\overline{EB}$ from equation (2) are entered into Table I as follows: $EA_5$, $\overline{EB_5}$, and 1 fall under residue-6 weight 1 column; $EA_4$, $\overline{EB_4}$, $EA_2$, $\overline{EB_2}$, $EA_0$, and $\overline{EB_0}$ fall under residue-6 weight 2 column; and $EA_3$, $\overline{EB_3}$, $EA_1$, and $\overline{EB_1}$ fall under residue-6 weight 4 column, as shown in Table I.

TABLE I

| weight 4 | weight 2 | weight 1 |
|---|---|---|
| $EA_3$ | $EA_4$ | $EA_5$ |
| $\overline{EB_3}$ | $\overline{EB_4}$ | $\overline{EB_5}$ |
| $EA_1$ | $EA_2$ | 1 |
| $\overline{EB_1}$ | $\overline{EB_2}$ | |
| | $EA_0$ | |
| | $\overline{EB_0}$ | |

Next, a second-level residue-6 carry-save addition is performed, as depicted in block 33. With a second set of residue-6 RACSAs that are similar to the above-described first set of residue-6 RACSAs, each column in Table I is grouped in three bits per residue in order to form the second level residue-6 values to be entered into Table II as follows: $EA_3$, $\overline{EB_3}$, and $EA_1$ become $W_0$ and $W_1$ in the residue-6 weight 4 column and residue-6 weight 2 column, respectively; $\overline{EB_1}$ remains in the residue-6 weight 4 column; $EA_4$, $\overline{EB_4}$, and $EA_2$ become $X_0$ and $X_1$ in the residue-6 weight 4 column and residue-6 weight 2 column, respectively; $\overline{EB_2}$, $EA_0$, and $\overline{EB_0}$ become $Y_0$ and $Y_1$ in the residue-6 weight 4 column and the residue-6 weight 2 column, respectively; $EA_5$, $\overline{EB_5}$, and 1 become $Z_0$ and $Z_1$ in the residue-6 weight 2 column and the residue-6 weight 1 column, respectively.

TABLE II

| weight 4 | weight 2 | weight 1 |
|---|---|---|
| $W_0$ | $W_1$ | |
| $X_0$ | $X_1$ | |
| $Y_0$ | $Y_1$ | |
| $\overline{EB_1}$ | $Z_0$ | $Z_1$ |

Subsequently, a third-level of residue-6 carry-sum addition is performed, as illustrated in block 34. With a third set of residue-6 RACSAs that are similar to the above-described first set of residue-6 RACSAs, each column in Table II is grouped in three bits per residue in order to form the second level residue-6 values to be entered into Table III as follows: $W_0$, $X_0$, and $Y_0$ become $P_0$ and $P_1$ in the residue-6 weight 4 column and the residue-6 weight 2 column, respectively; $\overline{EB_1}$ remains in the residue-6 weight 4 column; $W_1$, $X_1$, and $Y_1$ become $Q_0$ and $Q_1$ in the residue-6 weight 4 column and the residue-6 weight 2 column, respectively; $Z_0$ remains in the residue-6 weight 2 column; and $Z_1$ remains in the residue-6 weight 1 column.

TABLE III

| weight 4 | weight 2 | weight 1 |
|---|---|---|
| $P_0$ | $P_1$ | |
| $Q_0$ | $Q_1$ | |
| $\overline{B_1}$ | $Z_0$ | $Z_1$ |

Finally, a fourth-level of residue carry-save addition is performed, as shown in block 35. With a fourth set of residue-6 RACSAs that are similar to the above-described first set of residue-6 RACSAs, each column in Table III is grouped in three bits per residue in order to form the second level residue-6 values to be entered into Table IV as follows: $P_0$, $Q_0$, and $\overline{EB_1}$ become $R_0$ and $R_1$ in the residue-6 weight 4 column and the residue-6 weight 2 column, respectively; $P_1$, $Q_1$, and $Z_0$ become $S_0$, and $S_1$ in the residue-6 weight 4 column and the residue-6 weight 2 column, respectively; and $Z_1$ remains in the residue-6 weight 1 column.

TABLE IV

| weight 4 | weight 2 | weight 1 |
|---|---|---|
| $R_0$ | $R_1$ | |
| $S_0$ | $S_1$ | $Z_1$ |

The process of performing residue-6 carry-save additions continues until there is a maximum of only two entries per column for radices of the form $2^1$ ($2^1-1$). Other radices may be less reducible with RACSA arrays.

Generally speaking, the number of iterations for performing residue carry-save additions depends on the number of digits in exponents E of the floating-numbers and the number of radix n, as follows:

| Radix | Max height of column of residues | Number of iterations |
|---|---|---|
| 2 | 3 | 1 |
| 3 | $2\lceil E/2 \rceil + 1$ | $\lceil \log_{1.5} (2\lceil E/2 \rceil + 1) \rceil$ |
| 4 | 3 | 1 |
| 6 | $2\lceil (E-1)/2 \rceil + 1$ | $\lceil \log_{1.5} (2\lceil (E-1)/2 \rceil + 1) \rceil$ |
| 7 | $2\lceil E/3 \rceil + 1$ | $\lceil \log_{1.5} (2\lceil E/3 \rceil + 1) \rceil$ |
| 8 | 3 | 1 |
| 12 | $2\lceil (E-2)/2 \rceil$ | $\lceil \log_{1.5} (2\lceil (E-2)/2 \rceil) \rceil$ |
| 14 | $2\lceil (E-1)/3 \rceil$ | $\lceil \log_{1.5} (2\lceil (E-1)/3 \rceil) \rceil$ |
| 15 | $2\lceil E/4 \rceil$ | $\lceil \log_{1.5} (2\lceil E/4 \rceil) \rceil$ |
| 16 | 3 | 1 |

At this point, the bits shown in Table IV is ready to be decoded to form a set of fully-decoded shift amount signals, as depicted in block 36. Since there are only five inputs in this radix-6 example, the shift amount signals can be decoded by a decoder using the following boolean logic combinations:

shift $0=(\overline{R_0}$ AND $\overline{R_1}$ AND $\overline{S_0}$ AND $\overline{S_1}$ AND $\overline{Z})|((R_0$ XOR $S_0)$ AND $(1$ XOR $S_1)$ AND $\overline{Z})|(R_0$ AND $R_1$ AND $S_0$ AND $S_1$ AND $\overline{Z})$;

shift $1=(\overline{R_0}$ AND $\overline{R_1}$ AND $\overline{S_0}$ AND $\overline{S_1}$ AND $\overline{Z})|((R_0$ XOR $S_0)$ AND $(1$ XOR $S_1)$ AND $\overline{Z})|(R_0$ AND $R_1$ AND $S_0$ AND $S_1$ AND $\overline{Z})$;

shift $2=(\overline{R_0}$ AND $\overline{S_0}$ AND $(R_1$ XOR $S_1)$ AND $\overline{Z})|(R_1$ AND $S_1$ AND $(R_0$ XOR $S_0)$ AND $\overline{Z})|(R_0$ AND $R_1$ AND $\overline{S_0}$ AND $\overline{S_1}$ AND $\overline{Z})$ shift $3=(\overline{R_0}$ AND $\overline{S_0}$ AND $(R_1$ XOR $S_1)$ AND $Z)|(R_1$ AND $S_1$ AND $(R_0$ XOR $S_0)$ AND $Z)|(R_0$ AND $R_1$ AND $\overline{S_0}$ AND $\overline{S_1}$ AND $\overline{Z})$;

shift $4=(\overline{R_1}$ AND $\overline{S_1}$ AND $(R_0$ XOR $S_0)$ AND $\overline{Z})|(R_0$ AND $S_0$ AND $(R_1$ XOR $S_1)$ AND $\overline{Z})|(\overline{R_0}$ AND $\overline{R_1}$ AND $S_0$ AND $S_1$ AND $\overline{Z})$; and shift $5=(\overline{R_1}$ AND $\overline{S_1}$ AND $(R_0$ XOR $S_0)$ AND $Z)|(R_0$ AND $S_0$ AND $(R_1$ XOR $S_1)$ AND $Z)|(\overline{R_0}$ AND $\overline{R_1}$ AND $S_0$ AND $S_1$ AND $Z)$.

As has been described, the present invention provides an improved method for generating shift amount signals for an alignment shifter. This technique can also be applied to a fused multiply-adder in which the exponents of a multiplier and a multiplicand and the two's complement of the exponent of an addend are directly reduced in a RACSA array by introducing each digit of all exponents in the appropriate residue weight column as was show in Table I for the addition operation. Although a radix-6 alignment shifter is used to illustrate the present invention, it is understood by those skilled in the art that the principle of the present invention is also applicable to an alignment shifter of any radix.

While the invention has been particularly shown and described with reference to a preferred embodiment, it will be understood by those skilled in the art that various changes in form and detail may be made therein without departing from the spirit and scope of the invention.

What is claimed is:

1. A method for generating shift amount signals for an alignment shifter in a process of adding a first floating-point number and a second floating-point number, wherein said floating-point numbers includes a sign, a mantissa, and an exponent, said method comprising the steps of:

performing residue arithmetic on an exponent of said first floating-point number and an exponent of said second floating-point number to generate a residue shift amount by arranging binary digits of said exponent of said first floating-point number and said exponent of said second floating-point number into binary-valued residue representations, and performing multiple levels of residue carry-save additions on said binary-valued residue represented exponents; and decoding said residue shift amount to obtain shift amount signals readable by said alignment shifter.

2. The method according to claim 1, wherein said residue carry-save additions are performed by a plurality of residue arithmetic carry-save adders.

3. The method according to claim 1, wherein said decoding step is performed by a decoder.

4. A shift amount generator for generating shift amount signals for an alignment shifter in a process of adding a first floating-point number and a second floating-point number, wherein said floating-point numbers includes a sign, a mantissa, and an exponent, said shift amount generator comprising:

means for performing residue arithmetic on an exponent of said first floating-point number and an exponent of said second floating-point number to generate a residue shift amount, wherein said means of performing residue arithmetic further includes means for arranging binary digits of said exponent of said first floating-point number and said exponent of said second floating-point number into binary-valued residue representations; and means for performing multiple levels of residue carry-save additions on said binary-valued residue represented exponents; and means for decoding said residue shift amount to obtain shift amount signals readable by said alignment shifter.

5. The shift amount generator according to claim 4, wherein said means for performing residue carry-save additions are a plurality of residue arithmetic carry-save adders.

6. The shift amount generator according to claim 4, wherein said means for decoding is a decoder.

7. A computer program product residing on a computer usable medium for generating shift amount signals for an alignment shifter in a process of adding a first floating-point number and a second floating-point number, wherein said floating-point numbers includes a sign, a mantissa, and an exponent, said computer program product comprising:

program code means for performing residue arithmetic on an exponent of said first floating-point number and an exponent of said second floating-point number to generate a residue shift amount by arranging binary digits of said exponent of said first floating-point number and said exponent of said second floating-point number into binary-valued residue representations, and performing multiple levels of residue carry-save additions on said binary-valued residue represented exponents; and program code means for decoding said residue shift amount to obtain shift amount signals readable by said alignment shifter.

* * * * *